(12) United States Patent
Lanfranchi (10) Patent No.: US 12,534,308 B2
(45) Date of Patent: Jan. 27, 2026

(54) REARRANGING DEVICE

(71) Applicant: LANFRANCHI S.R.L., Collecchio (IT)

(72) Inventor: Mario Lanfranchi, Collecchio (IT)

(73) Assignee: LANFRANCHI S.R.L., Collecchio (IT)

( * ) Notice: Subject to any disclaimer, the term of this patent is extended or adjusted under 35 U.S.C. 154(b) by 99 days.

(21) Appl. No.: 18/404,954

(22) Filed: Jan. 5, 2024

(65) Prior Publication Data

US 2024/0228185 A1 Jul. 11, 2024

(30) Foreign Application Priority Data

Jan. 5, 2023 (IT) ......................... 102023000000108

(51) Int. Cl.
*B65G 47/14* (2006.01)
*B65G 47/248* (2006.01)

(52) U.S. Cl.
CPC ....... *B65G 47/248* (2013.01); *B65G 47/1485* (2013.01); *B65G 2203/0233* (2013.01); *B65G 2203/041* (2013.01)

(58) Field of Classification Search
CPC .............. B65G 47/248; B65G 47/1485; B65G 2203/041
USPC ............................................. 198/377, 377.02
See application file for complete search history.

(56) References Cited

U.S. PATENT DOCUMENTS 4,630,428 A * 12/1986 Lesch ....................... B65B 5/12
53/238
9,790,037 B2 * 10/2017 Gazzola ............... B65D 85/542

2012/0217131 A1 8/2012 Forni
2022/0371830 A1 11/2022 Faieta
2023/0242353 A1 * 8/2023 Tondreau, III ......... B65G 47/68
198/459.6

FOREIGN PATENT DOCUMENTS

| EP | 2746165 | * | 6/2014 |
| FI | 20090235 A1 | | 5/2011 |
| WO | 2012011010 A1 | | 1/2012 |
| WO | WO2019179685 | * | 9/2019 |
| WO | 2021104719 A1 | | 6/2021 |
| WO | WO2021104719 | * | 6/2021 |

OTHER PUBLICATIONS

Search Report From Italian Priority Application 102023000000108 Dated Jul. 14, 2023.

* cited by examiner

*Primary Examiner* — Gene O Crawford
*Assistant Examiner* — Lester Ill Rushin
(74) *Attorney, Agent, or Firm* — Carmel Patent Agency; Robert Ballarini

(57) ABSTRACT

A rearranging device for rearranging products is adapted to pick up the products from a supply area where they are randomly arranged and arrange them in a predefined way on a receiving area. The rearranging device includes viewing means to detect the orientation of the product and a control unit for processing the detected data and activating movement means adapted to pick up the product from the supply area. Depending on what is detected by the viewing means, the movement means receive from the control unit a command to deposit the product directly on the receiving area, or to deposit it on an orienting device configured to rotate the product, and release it, once rotated, on the receiving area.

18 Claims, 11 Drawing Sheets

REARRANGING DEVICE

FIELD OF APPLICATION OF THE INVENTION

The present invention relates to the field of rearranging devices of products adapted to be inserted within production lines. The purpose of said rearranging devices is to pick up randomly arranged products and arrange them in an ordered way and oriented in the manner required by the production line.

In particular, it relates to a rearranging device, for empty containers comprising non-symmetry elements defining a direction of orientation, adapted to arrange them supported, them preferably lying down, at a receiving area.

STATE OF THE ART

Several rearranging devices are known in the state of the art, consisting of complex machines with guided conveying systems of products initially arranged in bulk until an oriented arrangement is obtained.

Said systems are widely used for ordering products such as empty containers such as bottles or cans.

With the introduction of anthropomorphic robots capable of moving products, said machines have become simpler.

However, the anthropomorphic robot is not always capable of allowing the complete arrangement and orientation of all products.

In particular when said containers have non-symmetry elements, it is necessary to rotate them to orient them in the desired way, which is generally the same for all containers.

In general, the robot's working area has mechanical operating limits and does not allow the desired orientation to be obtained for all containers.

Furthermore, the means by which the robot picks up and retains the product also limits the orientation possibilities thereof. In fact, generally a very simple and light handling element, such as a suction cup, is installed on the robot, which only allows gripping on certain product surfaces.

Let us take the case in which the product is, for example, an empty canister shaped like a parallelepiped, with non-symmetry elements such as a mouth or a handle.

Said canister must be deposited lying down and oriented for example so that the same face is always supported on the receiving area. In order to be able to deposit the canister, the suction cup must engage on the face opposite the support face. If, in the initial bulk arrangement, said opposite face is not accessible, the robot must engage the suction cup on the support face. In this case, the robot will not be able to deposit the canister with the desired orientation.

EXPOSURE AND ADVANTAGES OF THE INVENTION

The technical problem underlying the present invention is that of making available a rearranging device which is structurally and functionally designed to overcome one or more of the limits set out above with reference to the known prior art.

In the context of the aforesaid problem, a main object of the invention is to develop a product rearranging device which allows products to be picked up from a supply area 4 in which they are randomly arranged and arrange them oriented in a predefined way, in particular arranging a face which we define as a support face on a receiving area.

It is a further object of the invention to make available in the art, a product rearranging device within the scope of a flexible, rational and rather affordable solution.

These and other objects are reached by the characteristics of the invention set forth in the independent claims. The dependent claims outline preferred and/or particularly advantageous aspects of the invention.

In particular, an embodiment of the present invention provides product rearranging device, in particular empty containers comprising non-symmetry elements, said rearranging device adapted to pick up said products from a supply area in which they are randomly arranged and arrange them oriented in a predefined way, preferably lying down, on a receiving area.

Said rearranging device preferably comprises viewing means to detect the orientation of the product and a control unit for processing the detected data and activating movement means adapted to pick up said product from the supply area.

In particular, depending on what is detected by the viewing means, the movement means receive the command from the control unit to deposit the product directly on the receiving area, or to deposit it on an orienting device configured to rotate the product, and release it, once rotated, on the receiving area.

Preferably the movement means comprise a robot comprising at least three rotation axes.

Preferably the robot comprises a handling element for picking up the product and preferably configured to engage on a support face or on an opposite face wherein the support face is such as to engage on the release area, once the product is properly oriented.

Preferably the handling element comprises suction means, which preferably comprise at least one suction cup.

Preferably the orienting device comprises gripping elements of the movable type, in particular rotatable, and activation means configured to move said gripping elements preferably to rotate them.

Preferably the gripping elements are configured to engage on the product by holding it during rotation, preferably to engage on the face opposite to the support face.

Preferably the orienting device comprises a plurality of gripping elements at a constant distance from each other and preferably arranged in such a way that when one gripping element is facing the receiving area there is another one facing the movement means.

Preferably the orienting device comprises a plurality of gripping elements radially arranged about their rotation axis or arranged along a closed loop path.

Preferably the orienting device comprises two opposite gripping elements so that they exchange their position at each rotation by 180°.

Preferably the gripping elements comprise suction devices that engage on the product.

Preferably the orienting device comprises first translation means to move the product closer to the receiving area, preferably by performing a vertical translation.

Preferably the orienting device comprises second translation means to move the product in a preferably horizontal direction.

Preferably said second translation means are configured to translate the product in the advancement direction of the receiving area preferably to synchronize the translation speed thereof with the movement of the receiving area.

Preferably, the viewing means are configured to read the product before it is picked up by the movement means, preferably on the supply area.

In particular, the subject matter of the invention is a system for rearranging products comprising a rearranging device, a supply area wherein the products are randomly arranged and a receiving area wherein the products are arranged oriented in a predefined way, preferably lying down.

Preferably the receiving area comprises advancement means and preferably is a conveyor belt.

In particular, it is an object of the invention to provide a method for rearranging products comprising non-symmetry elements by depositing them in a predefined oriented way, which provides, by means of a rearranging device, to:
- pick up said products from a supply area wherein the products are randomly arranged,
- check the orientation of the product by viewing means preferably before picking it up,
- process by the control unit the data collected by the viewing means and command the movement means so as to
- deposit the product directly on the receiving area, if the viewing means detect that the product is arranged on the supply area so as to allow said movement means to deposit it with the support face facing the receiving area and oriented in a predefined way, or alternatively to
- deposit the product on the orienting device, which provides rotating said product in order to deposit it oriented in a predefined way and with the support face facing the receiving area.

Preferably, said method provides rotating the product by 180° by means of the orienting device.

Preferably, said method provides releasing the product in a position lying down and oriented so that the same support face always rests on the receiving area.

Preferably said method provides, before depositing the product, to translate the orienting device in the direction moving closer to the receiving area, preferably vertically.

Preferably said method provides, before depositing the product, to translate the orienting device in the advancement direction of the receiving area and to preferably synchronize the speed of the orienting device with the movement of the receiving area.

Preferably said method provides to coordinate/synchronize all the movements of the orienting device, in particular the translation in the direction moving closer to the receiving area and the translation in the advancement direction of the receiving area.

Said objects and advantages are all achieved by the rearranging device, subject matter of the present invention, which is characterized by the provisions of the claims below.

BRIEF DESCRIPTION OF THE DRAWINGS

These and other features will be more apparent from the following description of certain embodiments illustrated by way of non-limiting example in the accompanying drawings.

DESCRIPTION OF THE INVENTION

With particular reference to the figure, a product rearranging device 1 is depicted.

Said rearranging device 1 is adapted to pick up said products 100 from a supply area 4 where they are randomly arranged and arrange them oriented in a predefined way on a receiving area 5.

In particular, the supply area 4 can be a hopper, or a support surface, or a conveyor belt, as depicted in the figure, where containers are arranged in a random or bulk way.

In particular, said products 100 comprise a support face 101 adapted to be arranged in contact with the receiving means 5.

For example, said products 100 can be empty containers 100a such as bottles, jars, cans, etc.

In fact, these are containers 100a, which must be oriented before entering, for example, filling lines.

Said products 100 preferably comprise non-symmetry elements 110.

In the case of containers 100a, said non-symmetry elements 110 can be a handle, or a mouth not positioned on the axis of symmetry of the container 100a, as is often the case with canisters or parallelepiped-shaped containers 100a.

In the case of containers 100a of the cylindrical type, the non-symmetry elements 110 can be decorative elements on the outer surface, etc.

Such non-symmetry elements 110 can for example also be a label placed on the side surface of a cylindrical container 100a or on a face of a non-cylindrical container 100a.

Preferably, the container 100a comprises at least one support face 101.

Said support face 101 can be flat, but also with a different shape such as a cylindrical or elliptical portion.

The term support face 101 refers to the face of the product 100, in particular the container 100a, which must rest on the release area 5 in order to have the required orientation.

For example, said support face 101, can be the bottom or a side face thereof if the container 100a is shaped like a parallelepiped, as depicted in the figures.

Said support face 101, can be the bottom or a portion of the cylindrical side surface if the container 100a is cylindrical in shape.

Preferably, the container 100a must be deposited on the release area 5 so that it is lying down and thus its support face 101 corresponds to a side face thereof, or a portion of the cylindrical side surface.

According to an aspect of the invention, said rearranging device 1 is configured to arrange said support face 101 on the receiving area 5.

Said receiving area 5 is preferably located below the rearranging device 1.

In particular, said receiving area 5 is configured to move the product 100 once it has been received and leave the space free for a new product 100 to be deposited.

Preferably the receiving area 5 comprises advancement means for advancing the product 100.

A preferred embodiment provides that the receiving area 5 is a conveyor belt 50. Said conveyor belt 50 advances, carrying the product 100 therewith.

We will not go into the details of said conveyor belt 50, which can be shaped in various ways known to a person skilled in the art, such as a roller shutter belt, flighted belts, as depicted in the figure, etc.

According to an aspect of the invention, said rearranging device 1 comprising movement means 10 for picking up and depositing said product 100.

In particular, said movement means 10 pick up the product 100 from a supply area 4 where they are randomly arranged.

Said rearranging device 1 preferably further comprises viewing means 20 to detect the orientation of the product 100.

Preferably, said viewing means 20 are positioned near the supply area 4. In particular, said viewing means 20 detect the orientation of the product 100 while it is still within the supply area 4 and before it is picked up.

Said rearranging device 1 preferably also comprises an orienting device 30.

In particular, the orienting device 30 cooperates with said viewing means 20 to receive from said movement means 10 the product 100 to be oriented.

In particular, the viewing means 20 detect how the product 100 is positioned in the supply area 4 in particular before being picked up by the movement means 10.

Said viewing means 20 are preferably arranged in a fixed position to ensure greater reading accuracy.

FIGS. 8 to 11 show a possible embodiment which provides that the supply area 4 is a pick-up belt 41 on which the products 100 are placed arranged randomly.

Said pick-up belt 41 advances until it brings the products at the working area of the movement means 10.

Figure 11:
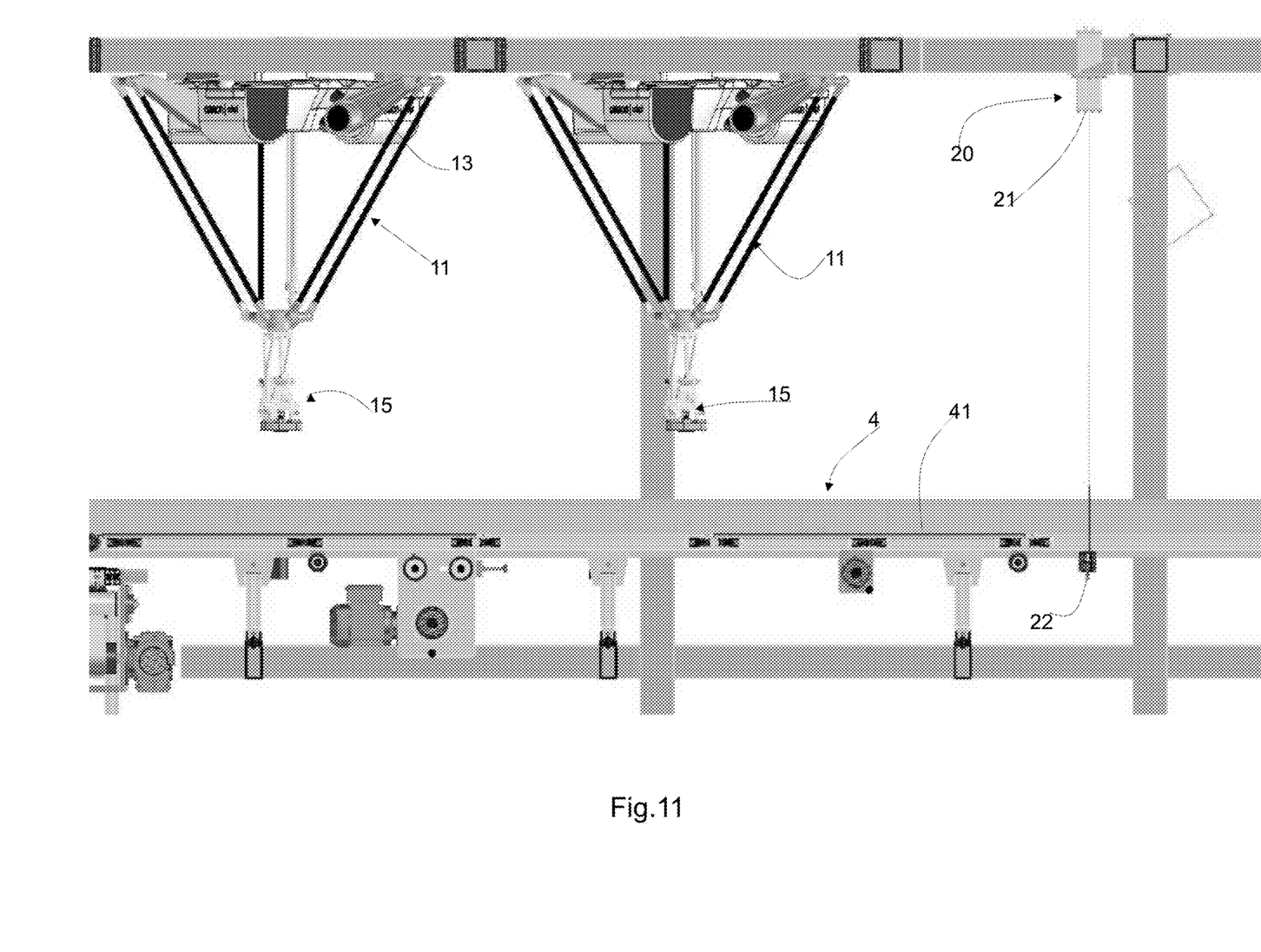

As depicted in FIG. 11, the viewing means 20 are arranged in supply area 4, in particular above the pick-up belt 41.

An embodiment is depicted in the figure which provides that said viewing means 20 comprise a camera 21 above the product conveyor 41 and preferably comprise an illuminator 22 e.g., placed inside the structure of the pick-up belt 41.

Preferably, what is detected by the viewing means 20 is sent to a control unit.

In particular, said control unit commands said movement means 10 so that they deposit the product 100 on the receiving area 5 or on the orienting device 30.

Said rearranging device 1 in particular comprises the viewing means 20 for detecting the orientation of the product 100 and the control unit for processing the detected data and activating the movement means 10 adapted to pick up said product 100 from the supply area 4.

Preferably, depending on what is detected by the viewing means 20, the movement means 10 receive the command from the control unit to deposit the product 100 directly on the receiving area 5, or to deposit it on an orienting device 30 configured to rotate the product 100, and release it, once rotated, on the receiving area 5.

In particular, said control unit commands said movement means 10 so that:

in a first case where the product 100 is picked up in an already correctly oriented way, the movement means 10 deposits it on the receiving area 5, in a second case where the product 100 is picked up in an incorrectly oriented way, the movement means 10 deposits it on the orienting device 30.

they deposit the product 100 directly on the receiving area 5, if the viewing means 20 detect that the product 100 is arranged on the supply area 4 so as to allow said movement means 10 to deposit it with the support face 101 facing the receiving area 5 and oriented in a predefined way, or alternatively they deposit the product 100 on the orienting device 30, which provides for rotating the product 100 in order to deposit it oriented in a predefined way and with the support face 101 facing the receiving area 5.

In particular, in the first case said movement means 10 deposit the product 100 directly on the receiving area 5, if the viewing means 20 detect that the product 100 in the supply area 4 is already arranged so that said movement means 10 can deposit it with the support face 101 facing the receiving area 5 and oriented in a predefined way with the required orientation.

In the second case where such a previous condition is not verified, i.e., if the viewing means 20 detect that the product 100 in the supply area 4 is arranged so that it cannot be directly deposited on the receiving area 5, said orienting device 30 receives from said movement means 10 the product 100 to be oriented.

In such a case, the movement means 10 release the product 100 to the orienting device 30, which in turn, after orienting the product 100, release it to the receiving area 5.

Figure 1A:
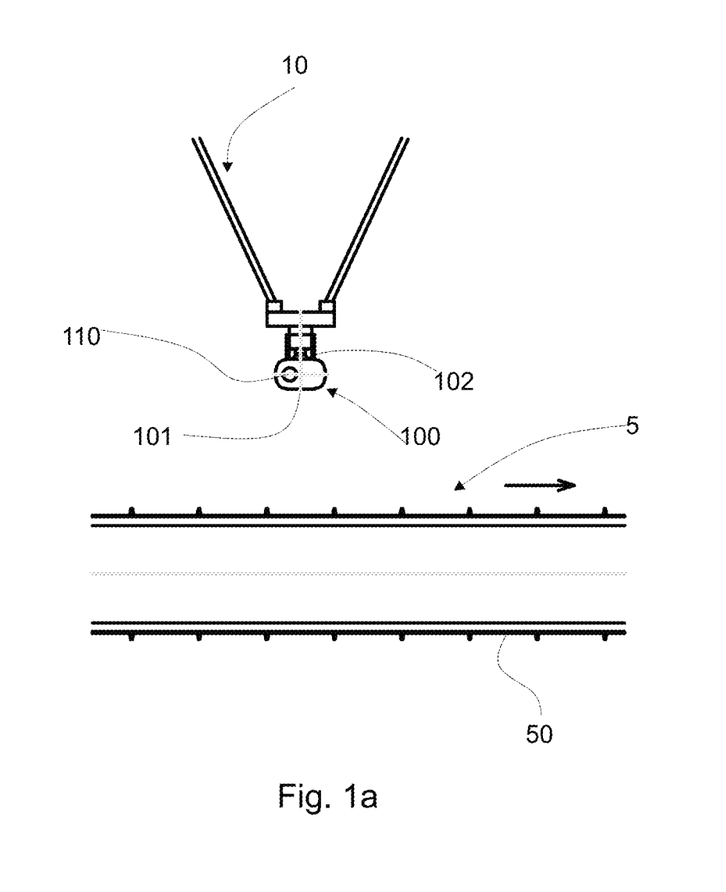
FIG. 1a, 1b: illustrates the movement means of the rearranging device in the movement step after product pick-up and in the deposit step on the receiving area, respectively.
Figure 1B:
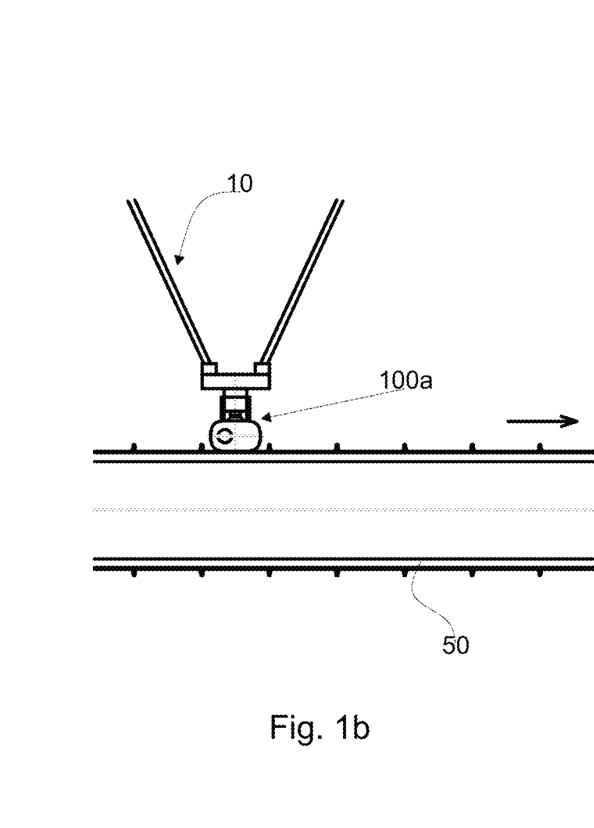

The two possible operating modes of the rearranging device 1 are depicted in FIGS. 1 and 2, respectively.

In particular, FIGS. 1a, 1b show the first case where the movement means 10 deposit the product 100 on the release area, while FIGS. 2a, 2b, 2c, 2d show the second case in which the movement means 10 deposit the product 100 on the orienting device 30. Preferably said orienting device 30 is configured to rotate the product 100, and release it rotated with said support face 101 correctly facing the receiving area 5.

In particular, the orienting device 30 is configured to receive the product 100 from the movement means 10.

Said movement means 10 can comprise, for example, one or more robots 11.

The use of a robot 11 makes the rearranging device 1 very flexible, as it can easily adapt to various pick-up and deposit positions of the product 100.

There are different types of robots 11, in particular of anthropomorphic type, that may fall within the scope of protection of the invention. Said types are all known to a person skilled in the art, such as a 'scara' or 'delta' type robot.

Preferably said robots 11 comprise at least three rotation axes, in order to ensure the aforesaid flexibility.

In addition to said robots 11, the movement means 10 can also include gantry devices preferably with at least three movement axes such as a horizontal translation, a vertical translation and a rotation.

A preferred embodiment depicted in the figure comprises a robot 11 generally referred to as a 'delta' which is particularly suitable for moving lightweight products 100, such as the empty cans depicted in the figure.

In particular, said robot 11 comprises an upper suspension, to which at least three swiveling actuator arms 13 are fixed.

Preferably the at least three actuator arms 13 each comprise at least two arm sections that can be rotated relative to each other and operated independently of each other.

We will not go into the details of the robot 11, in particular the delta robot, as it is known to a person skilled in the art.

In addition to the delta-type robot 11, an anthropomorphic robot 11 of a different type with 4, 5 or 6 working axes could be used.

According to an aspect of the invention, the robot 10 comprises a handling element 15 for picking up and in particular retain the product 100 gripped during its movement.

Preferably said handling element 15 is configured to engage on an engagement face 101, 102 which may be the support face 101 or the opposite face 102, to the support face 101.

For example, said opposite face 102 can be a side face thereof or side portion opposite the side support face 101 or the top face opposite the bottom, in particular if the product 100 or container 100a is shaped like a parallelepiped, as depicted in the figures.

Preferably the handling element 15 can comprise suction means 151 comprising at least one suction cup 152. Preferably such suction means further comprise a suction or venturi pump operatively connected to the suction cup 152.

Said suction cup 152 can be engaged on the engagement face 101, 102 which can be the support face 101 or on an opposite face 102.

Advantageously, the suction cup 152 allows to easily adapt the handling element 15 to the position of the product 100 and its engagement face 101, 102. In fact, the products 100 randomly arranged in the supply area 4 can also have positions not always easily accessible to grip.

In particular, to work correctly the suction cup 152 engages on a preferably flat portion of said support face 101 or opposite face 102.

Optionally, the handling element 15 can comprise mechanical means comprising at least one gripper.

Said gripper in particular is configured to engage on one or more engagement faces 101, 102, and/or on a protrusion of the product 100.

For example, in the case where the product 100 is a container 100a, such as a can, the gripper can comprise gripper handles that engage simultaneously by applying force to two opposite faces.

Alternatively, the gripper can engage e.g., on the upper face, in particular on the neck or handle of the container 100a or canister.

It is understood however that the solutions described above have a value of non-limiting example, therefore, possible variants of detail that may be necessary for technical and/or functional reasons, are considered from now falling within the same protective scope.

The product 100 is picked up from the supply area 4 by means of the handling element 15 and retained until it is deposited on receiving area 5 or on the orienting device 30.

According to an aspect of the invention, if the handling element 15 engages on the support face 101, the product 100 is deposited on the orienting device 30.

In such a case, in fact, the handling element 15, e.g., the suction cup 152, creates an obstruction which prevents the product 100 from being deposited with the support face 101, facing the receiving area 5.

Conversely, if the handling element 15 engages on a face other than the support face 101, it may not be necessary to deposit it on the orienting device 30 and it could be deposited directly on the receiving area 5.

In particular, if the handling element 15 engages on the opposite face 102, it can be deposited directly on the receiving area 5.

In such a case, in fact, the handling element 15, e.g., the suction cup 152, does not create an encumbrance at the support face 101, which must contact the receiving area 5.

As described above, the viewing means 20 check how the product is oriented preferably before it is picked up, and preferably in the supply area 4.

Thanks to this verification of the viewing means 20, the control unit commands the movement means 10 so that the handling element 15 engages on the engagement face 101, 102.

It is therefore known how the product 100 was picked up and therefore where it should be deposited.

In fact, the control unit then commands the movement means 10, indicating where to deposit the product 100.

If the product 100 needs to be oriented, it is released by the movement means 10 to the orienting device 30.

Said orienting device 30 comprises at least one gripping element 31.

Preferably it comprises a plurality of gripping elements 31 at a constant distance or pitch from each other.

Said gripping elements 31 are preferably arranged so that when one gripping element 31 faces the receiving area 5 there is another facing the movement means 10.

Advantageously, said gripping elements 31 are of the movable type, preferably swiveling.

In fact, the orienting device 30 preferably also comprises activation means 32 configured to move in particular to rotate said gripping elements 31.

A preferred embodiment provides that said gripping elements 31 are configured to engage on the product 100, retaining it during rotation.

The rotation that the gripping elements 31 are capable of performing can be comprised between 0 and 360 degrees. A possible embodiment can provide rotating the gripping elements 31 continuously in the same direction, i.e., for more than 360°, or alternately in opposite directions.

The rotation required depends on the position where the movement means 10 pick up the product 100 and the position of the release area 5.

The rotation required also depends on how the gripping elements 31 of the orienting device 30 are shaped.

The rotation of the gripping elements 31 can be performed in increments depending on the number of gripping elements 31 present on the orienting device 30.

One possible embodiment provides that the orienting device 30 comprises a plurality of gripping elements 31 arranged radially around their rotation axis as depicted in FIGS. 2 and 4.

A further possible embodiment provides that said gripping elements 31 are arranged along a closed loop path as depicted in FIG. 5.

In particular, FIG. 2 shows a first embodiment in which the orienting device 30 comprises two opposite gripping elements 31 so that they exchange their position at each rotation by 180°.

In particular, FIG. 4 shows a second embodiment in which the orienting device 30 comprises a plurality of gripping elements 31 arranged radially, preferably at a constant pitch from one another, in a star configuration.

In such a case, said gripping elements 31 change their position with each rotation by one pitch.

After a series of pitches, a gripping element 31 moves from the position to receive the product 100 from the movement means 10 to the position to release the product 100 on the receiving area 5.

In particular, FIG. 5 shows a third embodiment in which the orienting device 30 comprises a plurality of gripping elements 31 arranged along a closed-loop path and preferably arranged at a constant pitch from one another.

In said embodiment, the activation means 32 are configured to move said gripping elements 31 along a path that carries said gripping elements 31 from a position in which they are facing the movement means 10 to a position in which they are overturned towards the release area 5.

In such a case, the gripping elements 31 correspond to a plurality of gripping stations of products 100 arranged along the entire extension of a suction belt made according to a closed-loop path.

In such a case, at each advancement of a pitch, said gripping elements 31 change their position bringing a new gripping element 31 into position to receive the product 100 from the movement means 10 and a new gripping element 31 into position to release the product 100 on the receiving area 5.

In particular, the second and third embodiments allow the rearranging device 1 to continue working even if the receiving area 5 is stationary, thanks to the orienting device 30, which also performs the function of accumulating several products 100 before they are deposited.

Said gripping elements 31 can comprise suction devices 33 which engage on the product 100.

For example, such suction devices 33 comprise one or more suction cups 331, and/or a suction plane (depicted in FIG. 5) preferably controlled by a suction or venturi pump operatively connected thereto.

Said gripping elements 31 can be positioned on an outer surface 330 of the orienting device 30, in particular on opposite sides 330a, 330b in the case of the first embodiment.

Thereby, when the gripping elements 31 placed on one side 330a, engage with the product 100, the gripping elements 31 placed on the opposite side 330b can engage with another product 100 increasing the production efficiency of the orienting device. This production efficiency is further increased with the second and third embodiments in which a plurality of products can be retained on the orienting device 30 at the same time.

In particular, in the case where the gripping elements 31 are suction devices 33 and comprise suction cups 331 and/or a suction plane, these can be positioned on the outer surface 330 of the orienting device 30, for example on opposite sides 330a, 330b as depicted in FIG. 5.

Said suction devices 33 placed on the outer surface 330 of the orienting device 30 are preferably each controlled by a respective suction or venturi pump, allowing them to be used independently, either alternately or simultaneously.

A preferred embodiment provides that said gripping elements 31 are shaped to engage on the engagement face 101, 102 which is the opposite face 102, to the support face 101.

An example of preferred operation is depicted for the first embodiment in FIGS. 2a, 2b, 2c, 2d.

The figures depict a case in which the orienting device 30 performs a 180° rotation.

This solution is particularly simple and capable of meeting a high production rate.

In the figure, the release area 5 is positioned below the movement means 10 and below the orienting device 30.

Let us consider a product 100 of the container 100a type, in particular a canister which must be deposited on the release area 5 so that it is lying down and oriented with the neck orthogonal to the advancement direction and said neck facing downstream of said release area 5, for example of the conveyor belt 50 type.

Said canister, being positioned lying down, has one of the two side faces 101 as its support face, in the figure it is the face with the larger surface area.

Consequently, the opposite face 102 is also the opposite side face to the previous one, as depicted in the figure.

Figure 2A:
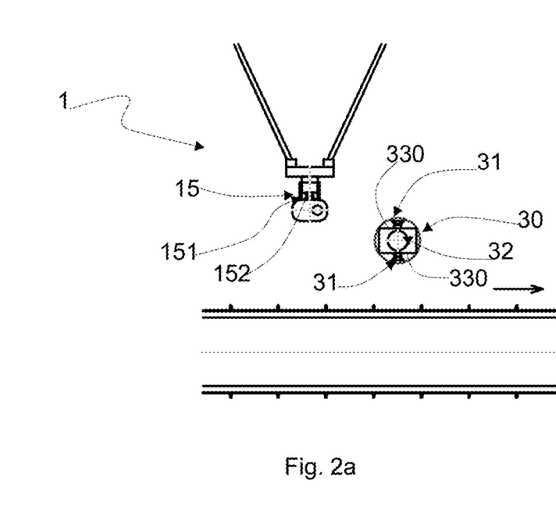
FIG. 2a, 2b, 2c, 2d: illustrates the working steps of the rearranging device where the movement equipment cooperates with the orienting device to deposit the product on the receiving area.

In FIGS. 1a and 2a, the movement means 10 pick up the product 100, e.g., said canister, by engaging on the support face 101, or an opposite face 102 in particular by means of a handling element 15 of the suction cup 152 type.

If the viewing means 20 detect that the product 100 in the supply area 4 is arranged so that it can be picked up by engaging the suction cup 152 on the opposite face 102, then the control unit gives the command to the movement means 10 to deposit directly on the receiving area 5 as depicted in FIG. 1b. Thereby, the canister will be arranged lying down with the mouth facing the advancement direction.

Figure 2B:
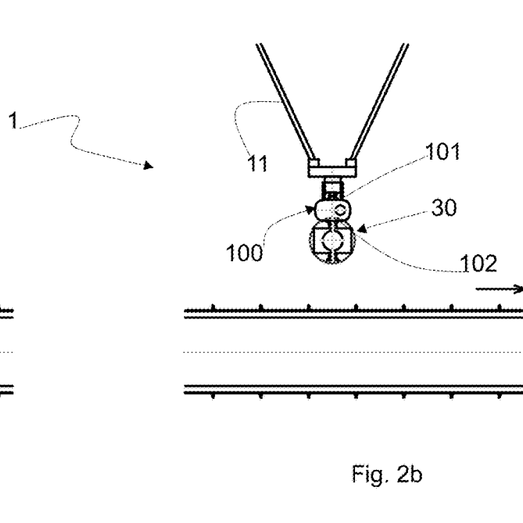

If the viewing means 20 instead detect that the product 100 in the supply area 4 is arranged so that it can be picked up by engaging the suction cup 152 on the support face 101, then the control unit gives the command to the movement means 10 to deposit on the orienting device 30 as depicted in FIG. 2b.

The orienting device 30 receives the canister lying down so that the opposite face 102 engages with the gripping elements 31, in such a case the suction device 33, as depicted in FIG. 2b.

Figure 2C:
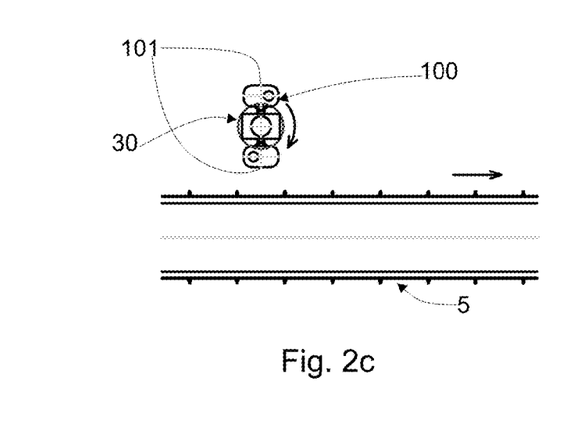

The suction device 33 retains the canister, while the activation means 32 rotate it, as depicted in FIG. 2c.

Figure 2D:
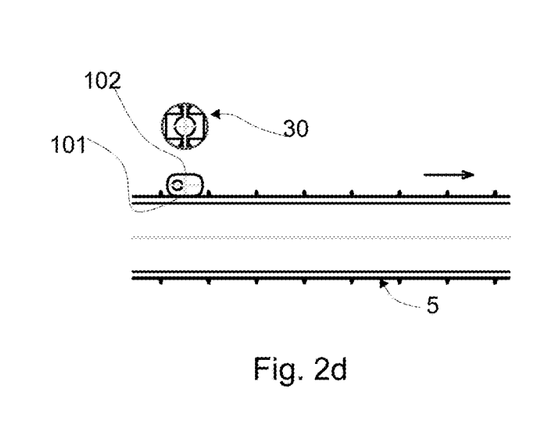
Figure 3A:
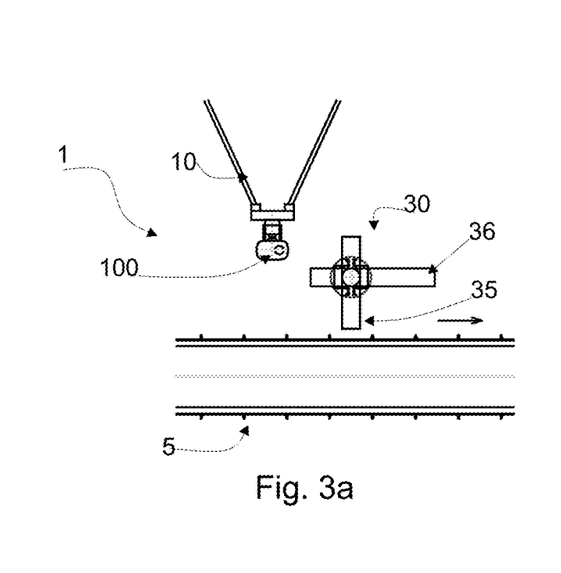
FIG. 3a, 3b, 3c, 3d, 3e: illustrates the working steps of the rearranging device where the movement means cooperate with the orienting device configured to translate during the deposit of the product on the receiving area.
Figure 3B:
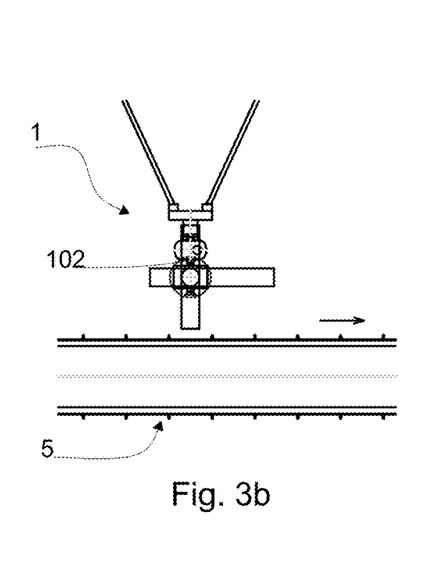
Figure 3C:
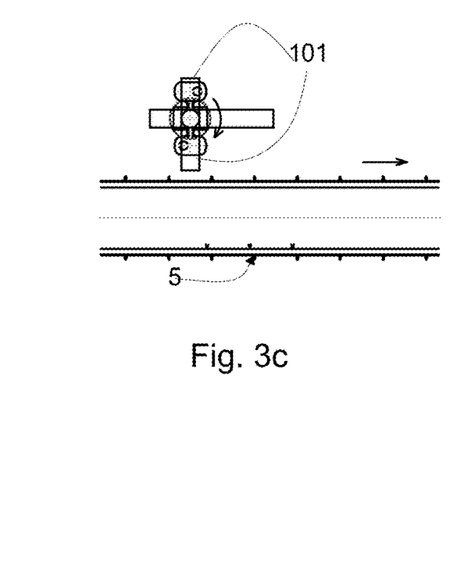
Figure 3D:
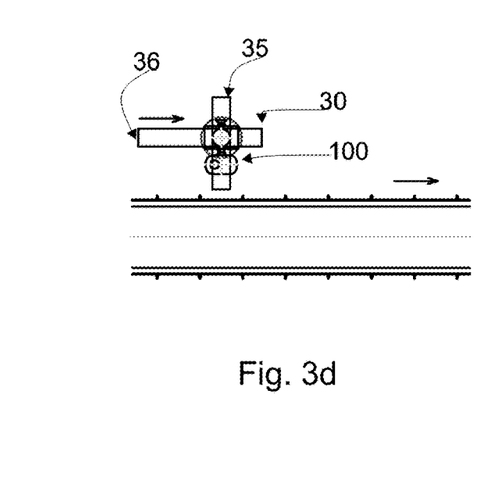
Figure 3E:
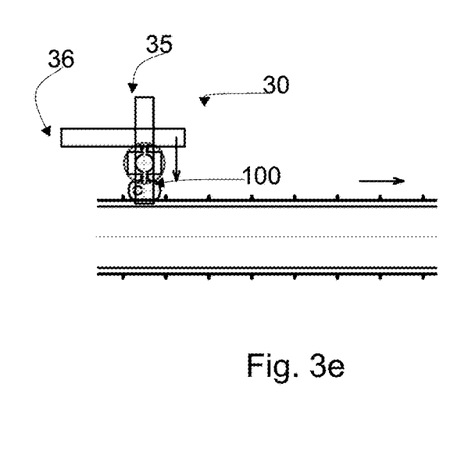
Figure 4A:
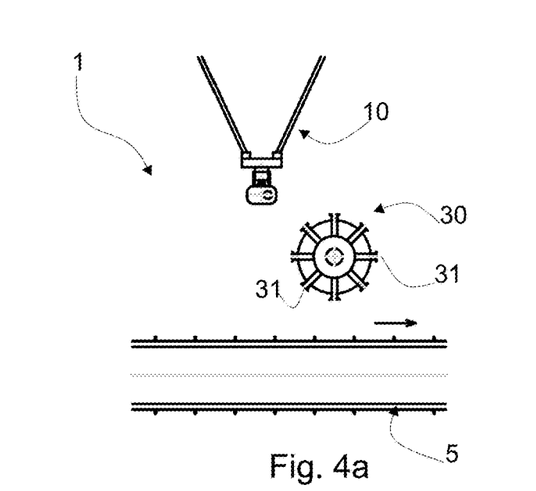
FIG. 4a, 4b, 4c, 4d, 4e: illustrates the working steps of a second embodiment of the rearranging device where the movement means cooperate with the orienting device to deposit the product on the receiving area.
Figure 4B:
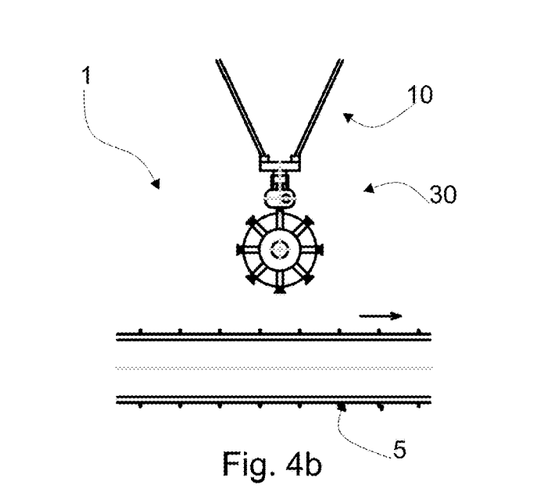
Figure 4C:
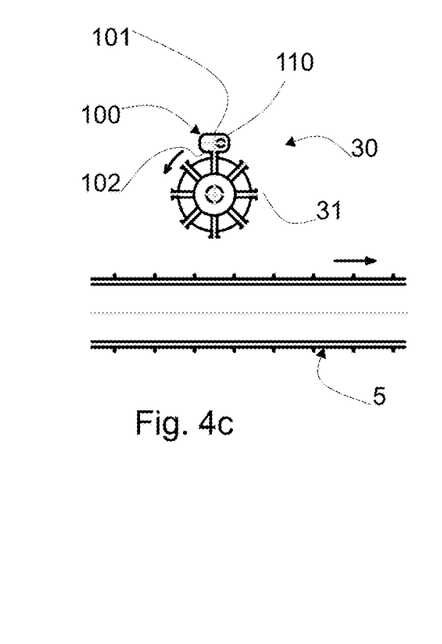
Figure 4D:
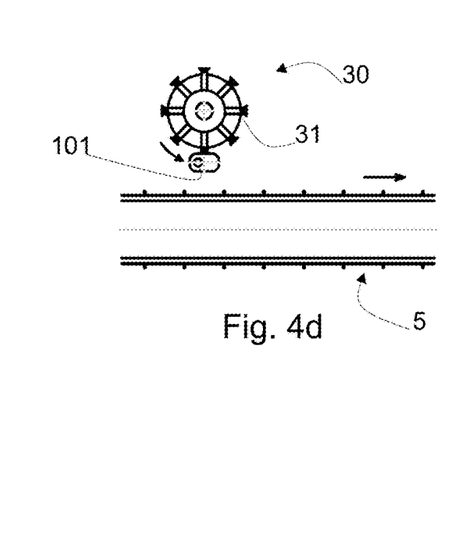
Figure 4E:
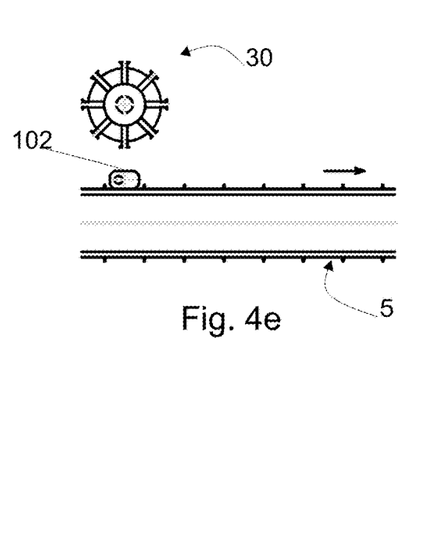
Figure 5A:
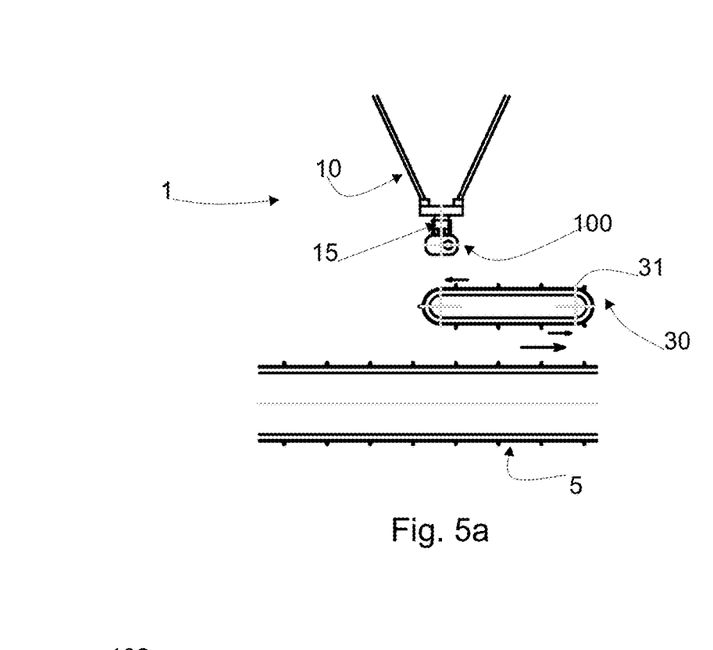
FIG. 5a, 5b, 5c, 5d, 5e: illustrates the working steps of a third embodiment of the rearranging device where the movement means cooperate with the orienting device to deposit the product on the receiving area.
Figure 5B:
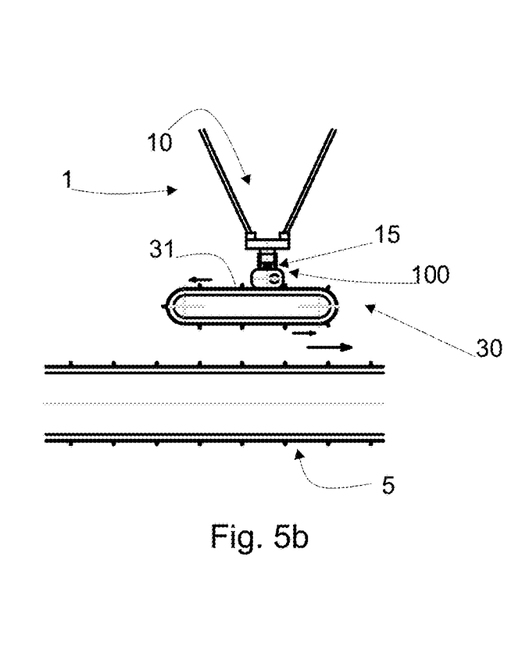
Figure 5C:
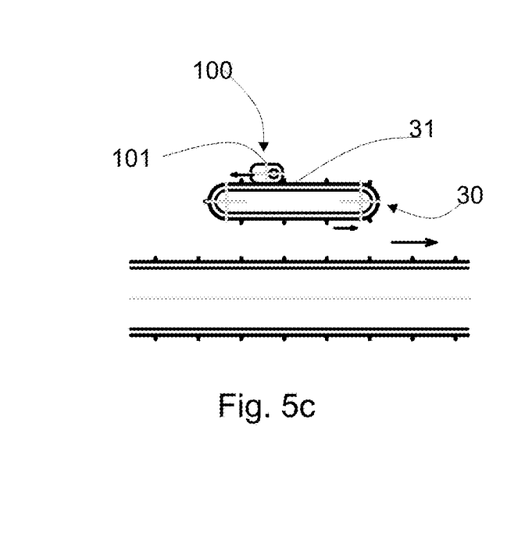
Figure 5D:
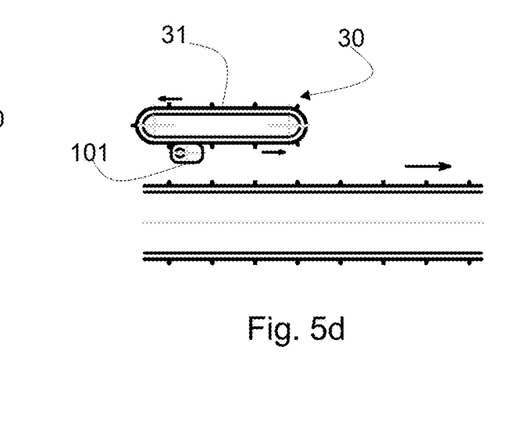
Figure 5E:
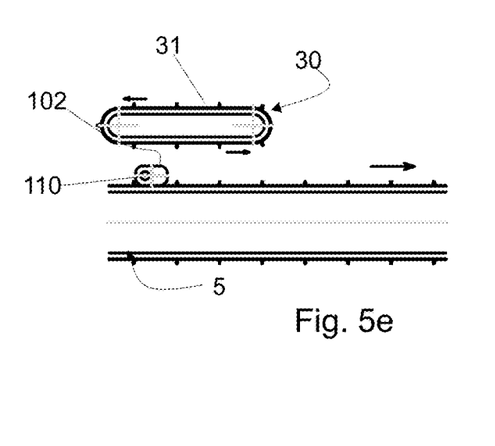
Figure 6:
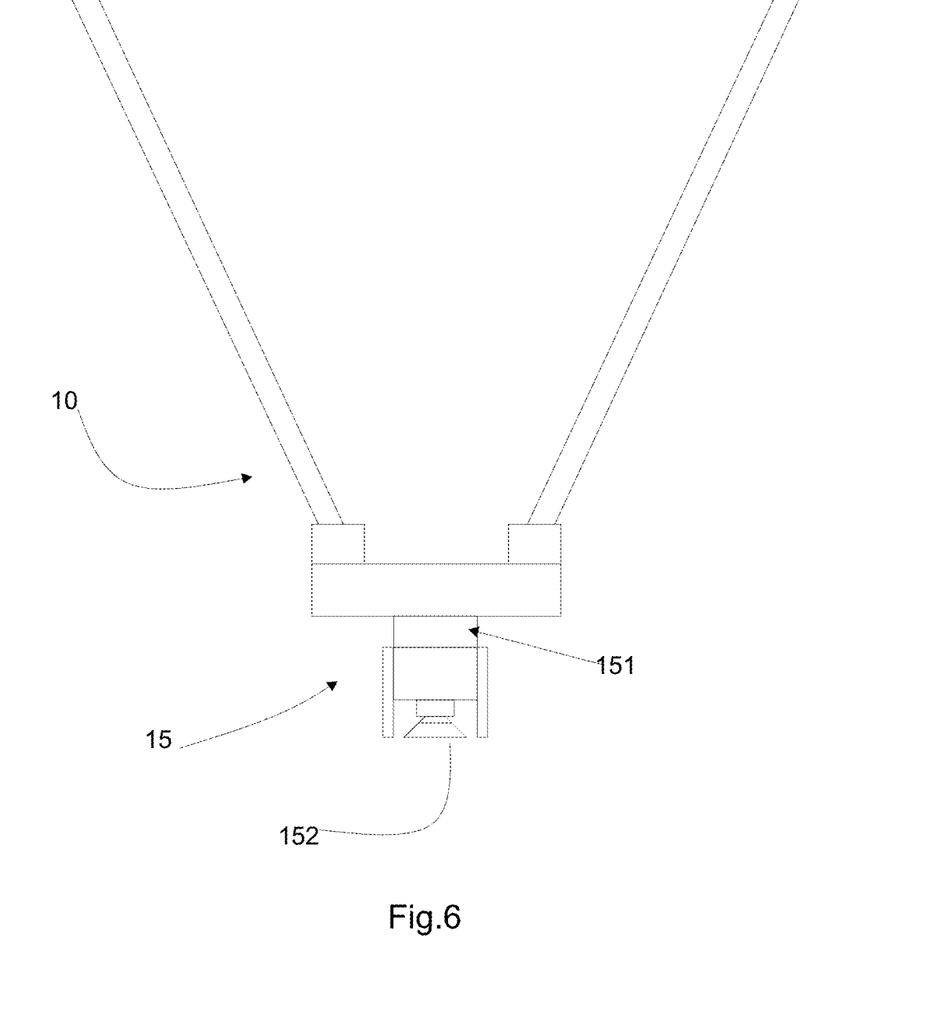
FIG. 6: illustrates a detail of the movement means in particular the handling element.
Figure 7:
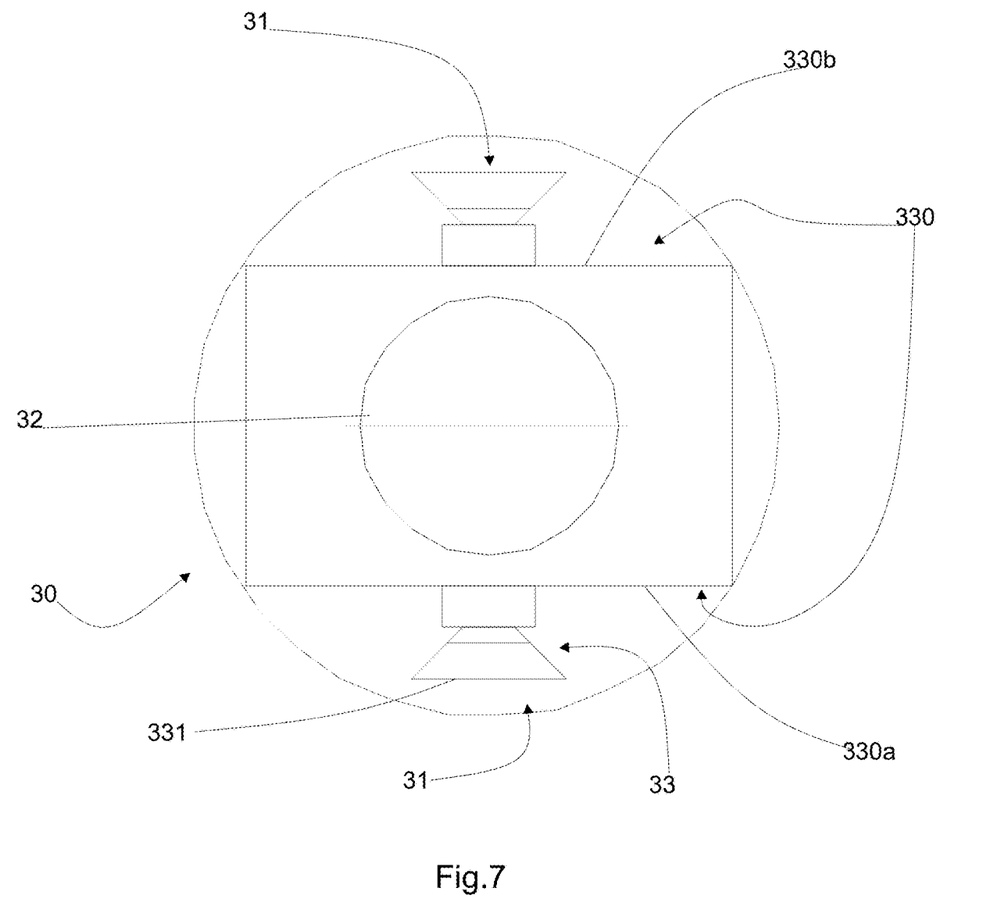
FIG. 7: schematically illustrates the orienting device.
Figure 8:
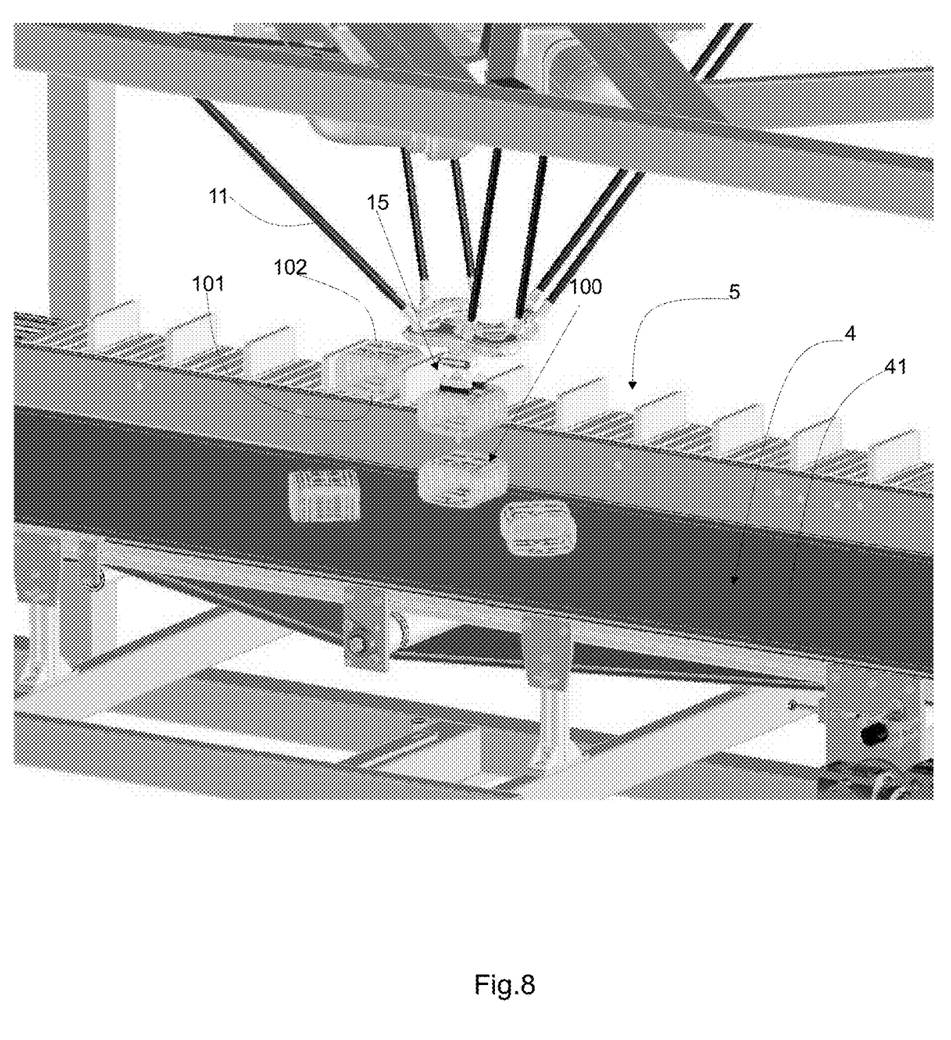
FIG. 8: illustrates an axonometric view of the movement means of the rearranging device during the movement step after picking up the product.
Figure 9:
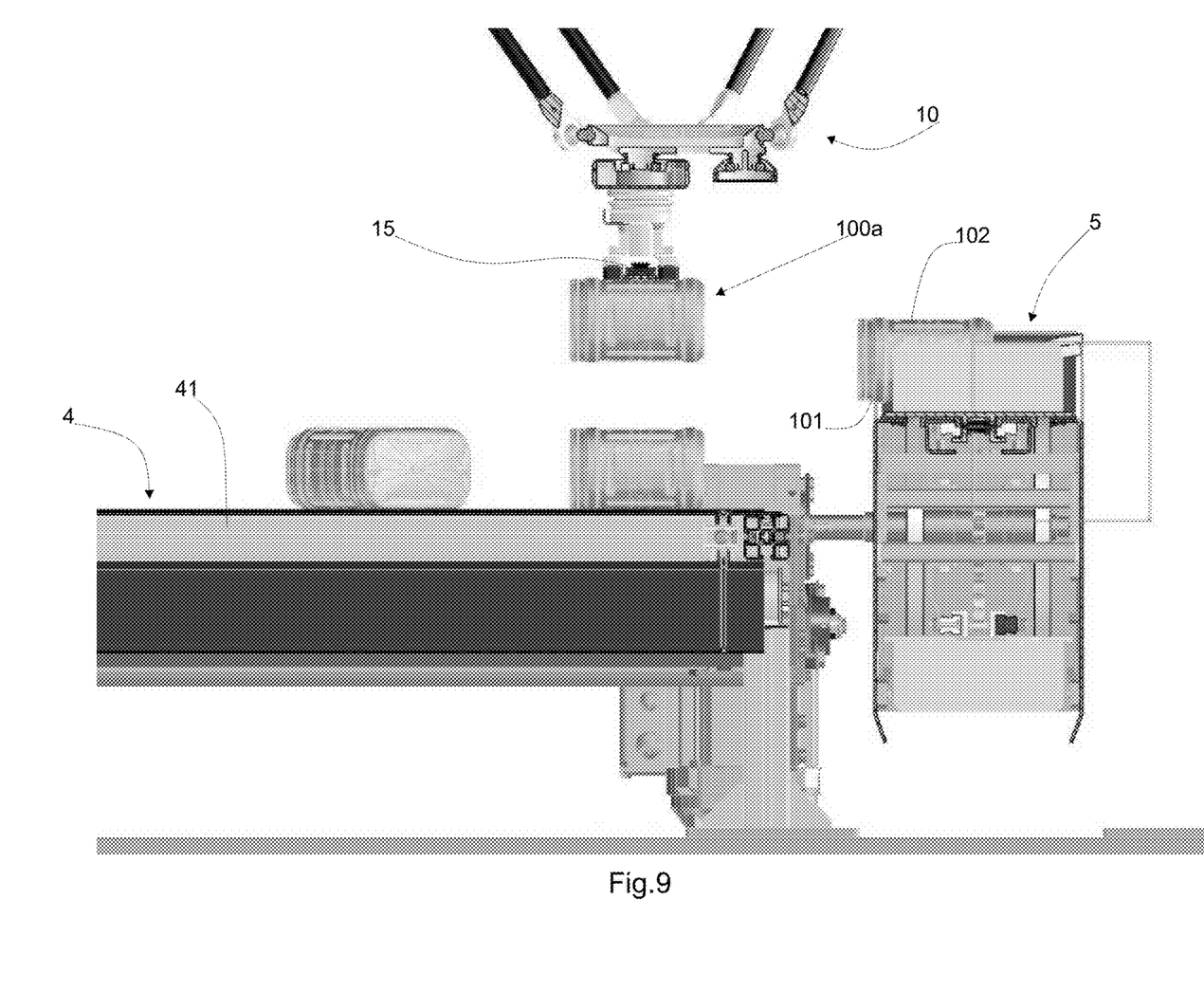
FIG. 9: illustrates a side view of the movement means of the rearranging device during the movement step after picking up the product.
Figure 10:
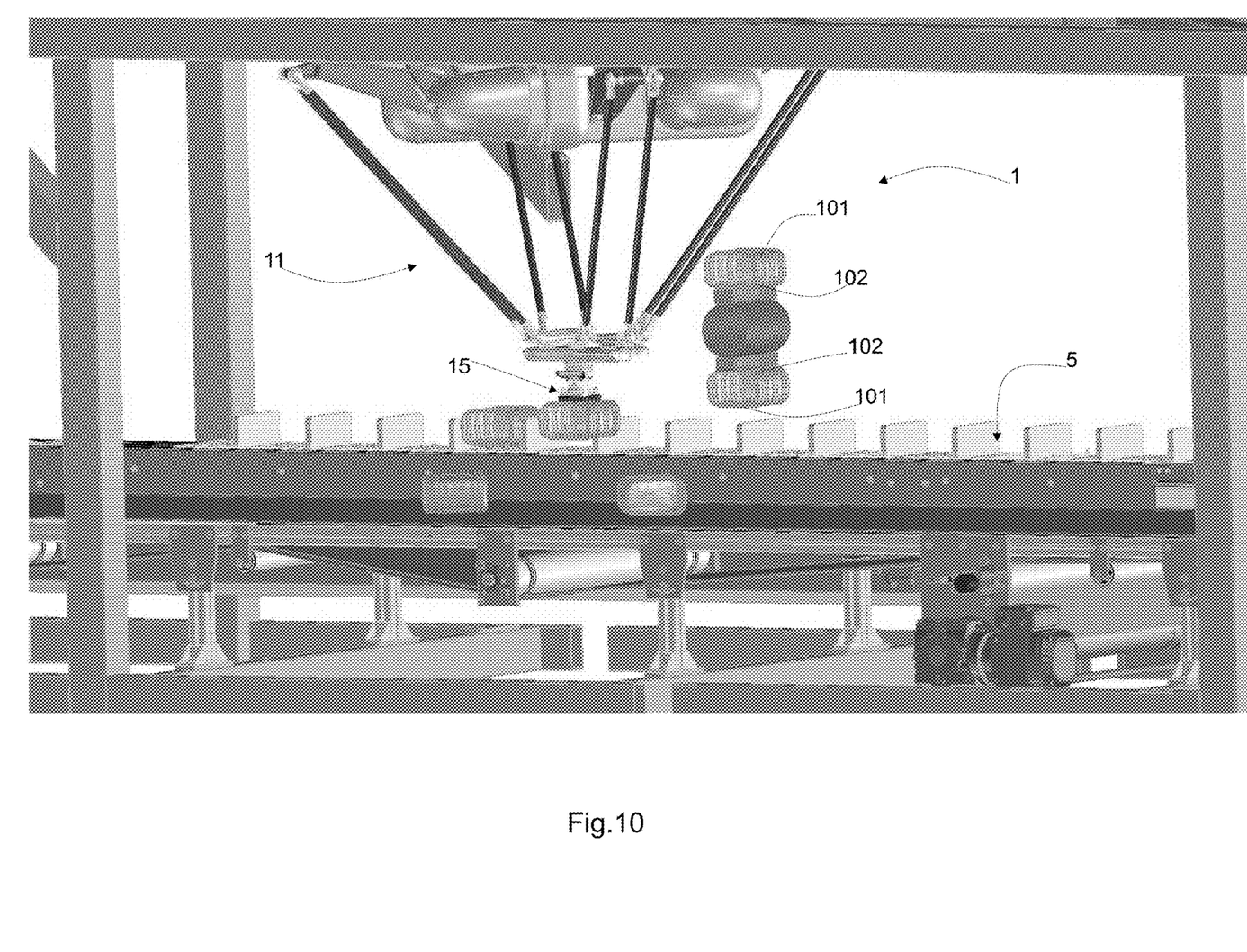
FIG. 10: illustrates a side view of the movement means with orienting device.

The orienting device 30 performs a 180° rotation and the suction means 33 deactivate the suction to deposit the container 100a on the release area 5 as depicted in FIG. 2d.

Therefore, the release area 5 being positioned below the orienting device 30, the release of the container 100a occurs vertically in particular by vertical fall.

Advantageously, while the suction means 33 placed on one side 330a, facing the release area 5, deactivate the suction to deposit the container 100a, the suction means 33 placed on the opposite side 330b, can activate the suction to receive a subsequent container 100a, from the movement means 10.

This allows to double the working capacity of the orienting device 30.

The same operation described above is realized with the second and third embodiments of the orienting device 30 in which the advancements or rotations of the gripping elements 31 will occur depending on the number of gripping elements 31 and in which a plurality of products 100 can be retained on the orienting device 30.

According to an aspect of the invention, said orienting device 30 comprises first translation means 35 for bringing the product 100 closer to the receiving area 5, as depicted in FIGS. 3a to 3e.

FIGS. 3a to 3e show an orienting device 30 according to the first embodiment, but said first translation means 35 also apply to rearranging devices made with the second or third embodiment.

Preferably said first translation means 35 perform a vertical translation in particular when the receiving means 5 are arranged below the orienting device 30.

In particular, said first translation means 35 are configured to perform a sufficient stroke to bring product 100 into contact with the receiving means 5.

This allows the product 100 to be released when in contact with the receiving area 5 without dropping it, to obtain a precise positioning.

A preferred embodiment provides that the orienting device 30 comprises second translation means 36 for translating the product 100 in a preferably horizontal direction, as depicted in FIGS. 3a to 3e.

FIGS. 3a to 3e show an orienting device 30 according to the first embodiment, but said second translation means 36 also apply to rearranging devices made with the second or third embodiment.

In particular, said second translation means 36 are configured to translate the product 100 in the advancement direction of the receiving area 5.

Preferably said second translation means 36 are configured to synchronize their translation speed with the movement of the receiving area 5.

Thanks to this solution, it is possible to deposit the product 100 at the same speed as the advancement area to obtain a release with precise positioning that improves the production rate of the rearranging device 1.

In particular, an advantageous solution that allows precision and speed is achieved through the cooperation of the second translation means 36 with the first translation means 35, coordinating the descent with the advancement.

To further improve the solution, in particular the production rate, said second translation means 36 and first translation means 35 can also cooperate synchronously with the activation means 32.

The object of the invention is also the system 200 for rearranging products 100 comprising a rearranging device 1, a supply area 4 where the products 100 are randomly arranged and a receiving area 5 preferably placed below the rearranging device 1.

The method for rearranging products 100 comprising preferably non-symmetry elements 110, depositing them in a predefined oriented manner, comprising a rearranging device 1, is also the subject of the invention, which provides to:

pick up said products 100 from a supply area 4 where the products 100 are randomly arranged, check the orientation of the product 100 by viewing means 20 preferably before picking it up, process by means of the control unit the data detected by the viewing means 20 and control the movement means 10 so that they deposit the product 100 directly on the receiving area 5, if the viewing means 20 detect that the product 100 is arranged on the supply area 4 so as to allow said movement means 10 to deposit it with the support face 101 facing the receiving area 5 and oriented in a predefined way, or alternatively they deposit the product 100 on the orienting device 30, which provides for rotating the product 100 in order to deposit it oriented in a predefined way and with the support face 101 facing the receiving area 5.

Said method provides for moving, preferably rotating said product 100, by means of the orienting device 30, preferably by 180°.

Said method provides arranging the product 100 in a position lying down and oriented so that, for example, the same support face 101 is resting on the receiving area 5.

In particular, said method provides, before depositing the product 100, translating the orienting device 30 in the direction moving closer to the receiving area 5, preferably vertically.

Preferably it provides, before depositing the product 100, translating the orienting device 30 in the advancement direction of the receiving area 5 and preferably synchronizing the speed of the orienting device 30 with the movement of the receiving area 5.

The method preferably provides to coordinate/synchronize all the movements of the orienting device 30, in particular the translation in the direction moving closer to the receiving area 5 and the translation in the advancement direction of the receiving area 5.

It in any case is intended for that described above to be given by way of non-limiting example; therefore possible detail variants that may be required for technical and/or functional reasons are considered from now as to fall within the same protective scope defined by the claims below.

The invention claimed is:

1. A rearranging device for rearranging products said rearranging device being adapted to pick up said products from a supply area in which the products are randomly arranged and arrange the products in a predefined way, on a receiving area, said rearranging device comprising viewing means to detect the orientation of the product and a control unit for processing the detected data and activating movement means adapted to pick up said product from the supply area, wherein according to what is detected by the viewing means the movement means receives a command from the control unit to deposit the product directly on the receiving area, or to deposit the product on an orienting device configured to rotate the product, and release the product, once rotated, on the receiving area, wherein the orienting device comprises two opposite gripping elements so that the gripping elements exchange positions at each rotation by 180°.

2. The rearranging device according to claim 1, wherein the movement means comprise a robot comprising at least three rotation axes.

3. The rearranging device according to claim 2, wherein the robot comprises a handling element for picking up the product and is configured to engage on a support face or on an opposite face wherein the support face engages on the release area, once the product is properly oriented.

4. The rearranging device according to claim 3, wherein the handling element comprises suction means which comprise at least one suction cup.

5. The rearranging device according to claim, 3 wherein the orienting device comprises rotatable gripping elements and activation means configured to rotate said gripping elements.

6. The rearranging device according to claim 5, wherein the gripping elements are configured to engage on the product by holding the product during rotation, engaging on the face opposite to the support face.

7. The rearranging device according to claim 5, wherein the gripping elements comprise suction devices that engage on the product.

8. The rearranging device according to claim 1, wherein the orienting device comprises a plurality of gripping elements at a constant distance from each other and arranged in such a way that when one gripping element is facing the receiving area there is another gripping element facing the movement means.

9. The rearranging device according to claim 1, wherein the orienting device comprises a plurality of gripping elements radially arranged about rotation axes thereof or arranged along a closed loop path.

10. The rearranging device according to claim 1, wherein the orienting device comprises translation means to move the product towards the receiving area by performing a vertical translation.

11. The rearranging device according to claim 1, wherein the orienting device comprises translation means to translate the product in a horizontal direction.

12. The rearranging device according to claim 1, wherein the viewing means are configured to read the product before being picked up by the movement means on the supply area.

13. A system for rearranging products comprising:
a rearranging device according to claim 1,
a supply area in which the products are randomly arranged and
a receiving area, in the form of a conveyor belt, wherein the products are arranged oriented lying down.

14. A rearranging device for rearranging products said rearranging device being adapted to pick up said products from a supply area in which the products are randomly arranged and arrange the products in a predefined way, on a receiving area, said rearranging device comprising viewing means to detect the orientation of the product and a control unit for processing the detected data and activating movement means adapted to pick up said product from the supply area, wherein according to what is detected by the viewing means the movement means receives a command from the control unit to deposit the product directly on the receiving area or to deposit the product on an orienting device configured to rotate the product, and release the product, once rotated, on the receiving area, wherein the orienting device comprises translation means to translate the product in a horizontal direction, said translation means being configured to translate the product in an advancement direction of the receiving area to synchronize a translation speed thereof with a movement of the receiving area.

15. A method for rearranging products comprising non-symmetry elements, depositing the products in a predefined orientation, utilizing a rearranging device adapted to pick up said products from a supply area in which the products are randomly arranged and arrange the products in a predefined way, on a receiving area, said rearranging device comprising viewing means to detect the orientation of the product and a control unit for processing the detected data and activating movement means adapted to pick up said product from the supply area, wherein according to what is detected by the viewing means the movement means receives a command from the control unit to deposit the product directly on the receiving area, or to deposit the product on an orienting device configured to rotate the product, and release the product, once rotated, on the receiving area, the method comprising:
picking up said products from a supply area in which the products are randomly arranged,
checking the orientation of the product by viewing means before picking the product up,
processing, by the control unit, data collected by the viewing means and command the movement means,
translating the orienting device in an advancement direction of the receiving area and to synchronize a speed of the orienting device with the movement of the receiving area,
depositing the product directly on the receiving area, if the viewing means detect that the product is arranged on the supply area so as to allow said movement means to deposit the product with the support face facing the receiving area and oriented in a predefined way, or
depositing the product on the orienting device, which provides rotating the product in order to deposit the product oriented in a predefined way and with the support face facing the receiving area.

16. The method according to claim 15, further comprising rotating said product by means of the orienting device by 180°.

17. The method according to claim 15, further comprising releasing the product in a position lying down and oriented so that the support face always rests on the receiving area.

18. The method according to claim 15, further comprising translating, before depositing the product, the orienting device in a vertical direction toward the receiving area.

* * * * *